United States Patent
Moribe et al.

(10) Patent No.: US 8,827,460 B2
(45) Date of Patent: Sep. 9, 2014

(54) PROJECTOR SYSTEM AND DEVICE, RECORDING MEDIUM STORING POSITION DETECTION PROGRAM, AND IMAGE PROVIDING METHOD

(75) Inventors: Mineo Moribe, Kawasaki (JP); Shinichiro Mori, Kawasaki (JP); Yuichi Hanada, Kawasaki (JP); Takahiro Umada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 13/240,761

(22) Filed: Sep. 22, 2011

(65) Prior Publication Data
US 2012/0140319 A1 Jun. 7, 2012

(30) Foreign Application Priority Data
Dec. 3, 2010 (JP) ................... 2010-270815

(51) Int. Cl.
G03B 21/62 (2014.01)
G06F 3/042 (2006.01)
G03B 17/54 (2006.01)

(52) U.S. Cl.
CPC .............. G03B 17/54 (2013.01); G06F 3/0425 (2013.01)
USPC ................. 353/42; 353/46; 359/443; 359/460

(58) Field of Classification Search
CPC ........ G03B 21/10; G03B 21/14; G03B 21/60; G03B 21/62; H04N 9/3129; H04N 9/3161; H04N 9/3194; H04N 9/3197
USPC .......... 353/42, 46, 74, 98, 121, 122; 359/443, 359/460
See application file for complete search history.

(56) References Cited

U.S. PATENT DOCUMENTS

2010/0182137 A1 * 7/2010 Pryor .................... 340/425.5

FOREIGN PATENT DOCUMENTS

| JP | 1993-233148 A | 9/1993 |
| JP | 2002-32193 A | 1/2002 |
| JP | 2007-141177 A | 6/2007 |
| JP | 2009-70245 A | 4/2009 |

OTHER PUBLICATIONS

Japanese Office Action issued Mar. 4, 2014 for corresponding Japanese Patent Application No. 2010-270815, with Partial Translation, 7 pages.

* cited by examiner

Primary Examiner — Kevin Pyo
(74) Attorney, Agent, or Firm — Fujitsu Patent Center

(57) ABSTRACT

A projector device includes an acquisition unit configured to acquire an image from an image pickup unit that picks up the image on a projection side of a transmissive type screen to which a display image is projected by a projector; a detection unit configured to detect a position where a luminance is changed on the acquired image; and an output unit configured to output the position on the acquired image where the change in luminance is detected.

9 Claims, 15 Drawing Sheets

PROJECTOR SYSTEM AND DEVICE, RECORDING MEDIUM STORING POSITION DETECTION PROGRAM, AND IMAGE PROVIDING METHOD

CROSS-REFERENCE TO RELATED APPLICATIONS

This application is based upon and claims the benefit of priority of the prior Japanese Patent Application No. 2010-270815, filed on Dec. 3, 2010, the entire contents of which are incorporated herein by reference.

FIELD

Various embodiments described herein are related to a projector, a recording medium storing a position detection program, an image providing method, and a projector system.

BACKGROUND

A rear projection method projector device, in other words, a rear projection system is known. The rear projection method displays an image area on a front side of a screen by transmitting light that is projected from a rear side of the screen by a projector device to the front side of the screen where a viewer is positioned.

Japanese Laid-Open Patent Publication No. 05-233148 discusses a projector device with a coordinate input function to detect a position specified by a user on a screen displayed by the rear projection method. The projector device having the coordinate input function includes a video camera that picks up a rear side of a screen installed at substantially the same position as the projector. Moreover, a lens of the video camera is provided with a filter that typically passes a bright spot of a laser beam of light that transmits from a front side to a rear side of the screen. The projector device with the coordinate input function uses a coordinate input unit such as a laser beam pointer to specify a coordinate on the screen. The coordinate input unit and the filter allow the video camera to output an image that typically includes a bright spot by the coordinate input unit.

SUMMARY

According to an aspect of the invention, a projector device includes an acquisition unit configured to acquire an image from an image pickup unit that picks up the image on a projection side of a transmissive type screen to which a display image is projected by a projector; a detection unit configured to detect a position where a luminance is changed on the acquired image; and an output unit configured to output the position on the acquired image where the change in luminance is detected.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
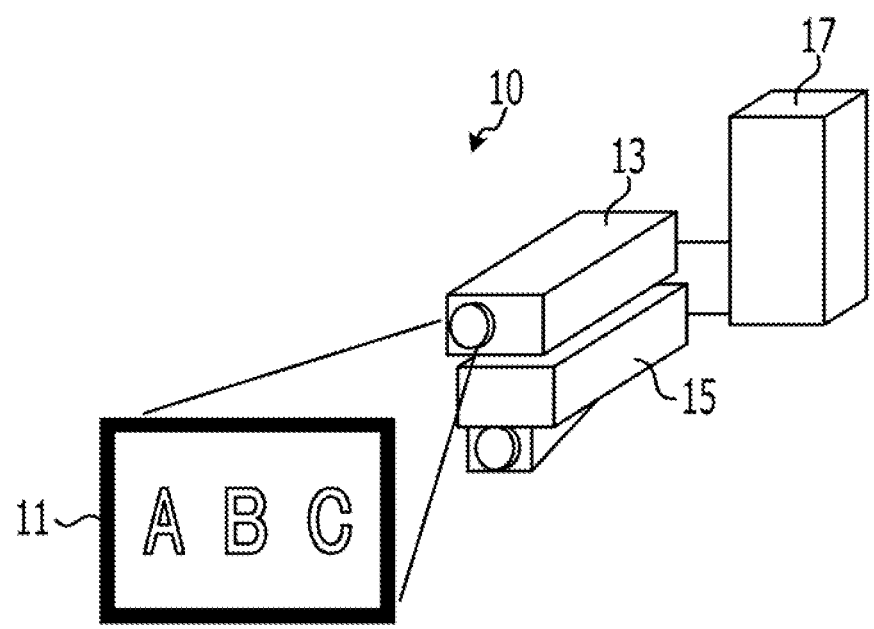
FIG. 1 is a perspective view illustrating an external configuration of a projector system according to a first embodiment.

Reference will now be made in detail to the embodiments, examples of which are illustrated in the accompanying drawings, wherein like reference numerals refer to the like elements throughout. The embodiments are described below to explain the present invention by referring to the figures. In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present.

According to the above-described related art; hardware is additionally required to specify a position by a user. In other words, in the above-described projector having the coordinate input function, a coordinate input unit to irradiate light by a user to a screen is needed in addition to the projector and the camera. Moreover, the filter that typically passes a bright spot by the coordinate input unit needs to be provided to the lens of the video camera.

A projector that allows a position on a screen specified by a user to be detected with a device configuration, a recording medium that stores a position detection program, an image providing method, and a projector system is proposed.

Hereinafter, embodiments of the projector device, the recording medium that stores the position detection program, the image providing method, and the projector system according to the disclosure will be described by referring to the accompanying drawings. The embodiments do not limit the disclosed technologies and the embodiments may be combined as appropriate within a range that the contents of processing do not contradict.

First Embodiment

Configuration of a Projector

FIG. 1 is a perspective view illustrating an external configuration of a projector system according to a first embodiment. A projector system 10 in FIG. 1 employs a rear projection method in which an image is displayed on a front side of a screen by transmitting light projected by a projector 13 from a rear side of a screen 11 to a front side of the screen where a viewer is positioned.

Here, a plane to which an image is projected on the screen 11 is referred to as a rear side, in other words, a plane that is positioned at a rear side of the screen 11 viewed by a user who is present at an opposite side of the projector 13 with the screen 11 therebetween. Furthermore, an opposite plane of the projected side on the screen 11, in other words, a plane facing the user is referred to as a front side.

As illustrated in FIG. 1, the projector system 10 includes the screen 11 that is a transmissive type that allows light to be transmitted. Moreover, the projector system 10 includes a projector 13 that projects a display image from a rear side toward a front side of the screen 11. Furthermore, the projector system 10 includes a camera 15 that is a pickup unit provided to allow an image of a rear side of the screen 11 to be picked up. In other words, the camera 15 takes an image of a rear side of the screen and send the image to a controller 17. The projector 13 and the camera 15 are coupled to and are controlled by a controller 17, which will be described later.

The projector system 10 according to the embodiment acquires an image picked up by camera 15 of the rear side of the screen 11. Hereinafter, an image acquired by the camera 15 may be expressed as a pickup image. The projector system 10 according to the embodiment detects a position where luminance is changed in an image acquired by the camera 15. Moreover, the projector system 10 according to the embodiment outputs the position where a change in luminance is detected on the image. In other words, the projector system 10 according to the embodiment outputs a position where a change in luminance is detected on the pickup image as a position on the screen specified by a user by using a phenomenon that an amount of reflection of projected light of the projector 13 changes at a position where the user's finger touches.

The above processing will be described. Light projected by the projector 13 travels to the front side by passing through the screen 11 when the user's finger does not touch the screen 11. Meanwhile, when the user's finger touches the screen 11, projected light passing through the screen 11 returns to a direction of the camera 15 after being reflected at the user's finger that contacts to the front side of the screen 11. Accordingly, a reflection amount of projected light of an area corresponding to the position where the user's finger touches on the front side of the screen 11 increases compared with the area on the screen that is picked up when the user's finger does not touch the screen 11. Thus, luminance of an area corresponding to a position where the user's finger touches on the image picked up by the camera 15 increases. Accordingly, a position over an image where luminance is changed may be estimated as a position specified by the user on the image displayed on the front side of the screen 11 with a high probability.

It is assumed that a correspondence relationship between a display image and a pickup image, in other words, a pixel position (x1, y1) on the display image is associated with a pixel position in the pickup image beforehand. The correspondence relationship may be calculated, for example, by a projection view angle and an optical axis direction of the projector 13, a distance from the projector 13 to the screen 11, a pickup image angle and an optical axis direction of the camera 15, and a distance from the camera 15 to the screen 11. Moreover, for example, a marker a position of which may be detected in a pickup image is included in a display image. The display image that includes the marker is picked up by the camera 15. The pixel position of the marker in the display image corresponds to which pixel position in the pickup image may be identified by identifying the marker position in the pickup image. It is assumed that the entire rear side of the screen 11 to which the display image is projected is included in the pickup image. Hereinafter, for convenience of the description, it is assumed that the entire rear side of the screen 11 to which the display image is projected is picked up in the entire pickup image.

As described above, the projector system 10 according to the embodiment may, for example, output a position on a screen specified by a user by performing image processing by software using a pickup image that is picked up by the camera 15. Hence, in the projector system 10 according to the embodiment, hardware such as a laser beam pointer and a filter as in the projector with the coordinate input function in the above-described related art is unnecessary. Furthermore, the projector system 10 according to the embodiment, hardware to detect a change in a capacitance and a voltage used, for example, for a touch panel is also unnecessary. Thus, the projector system 10 according to the embodiment allows a position on a screen specified by a user to be detected with a device configuration.

Figure 2:
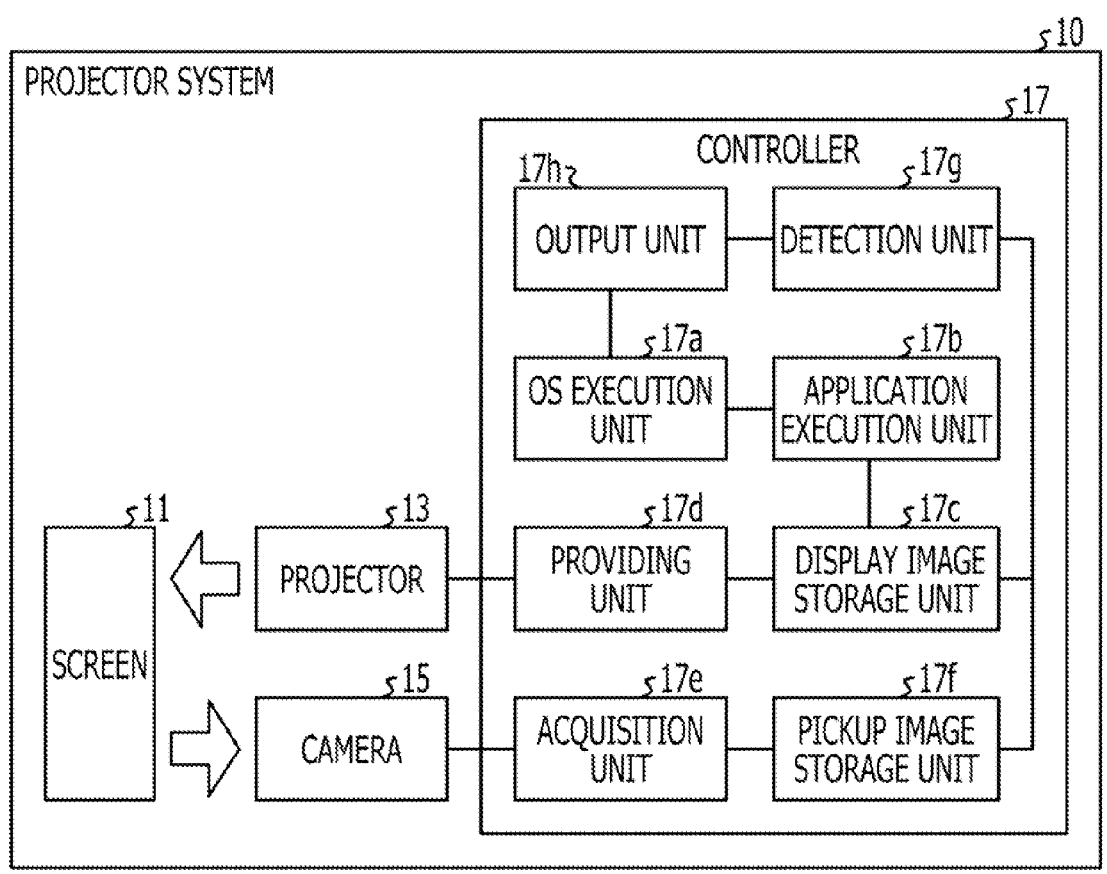
FIG. 2 is a block diagram illustrating a functional configuration of the projector system according to the first embodiment.

FIG. 2 is a block diagram illustrating a functional configuration of the projector system according to the first embodiment. As illustrated in FIG. 2, the projector system 10 includes the screen 11, the projector 13, the camera 15, and the controller 17. The projector system includes various functional units, not illustrated, for example, various types of input devices, display devices, and audio output devices.

The screen 11 may be a flat surface or a curved surface over which a display image projected by the projector 13 is displayed. As an example of the screen 11, a transparent material, for example, a ground glass may be used so that an image that is projected from a rear side may be transmitted and scattered toward the front side. For example, a user's finger that touches the front side may be seen through and may be viewed from the rear side. In order to improve directivity of projected light, a Fresnel lens with a focus distance that is substantially the same distance between the screen 11 and the projector 13 may be provided to the rear side of the screen 11 on which light projected from the projector 13 is incident.

The projector 13 displays a display image by projecting the display image on the screen 11. The display image to be projected to the screen 11 by the projector 13 is supplied to the projector 13 by a controller 17, which will be described later.

As an example of the projector 13, a projector included in a mobile terminal such as a Personal Handyphone System (PHS) and a projector used for a known rear projection system may be used. The projector 13 may be arranged at a position with a sufficient distance from the screen 11 so that a display image projected by the projector 13 may be projected, for example, to the entire screen.

The camera 15 picks up an image. As an example of the camera 15, a Charge Coupled Device (CCD) and a Complementary Metal Oxide Semiconductor (CMOS) may be used. Moreover, a camera included in a mobile terminal may be used as the camera 15 as in the above-described projector 13. An image of a rear side of the screen 11 picked up by the camera 15 is output to a controller 17, which will be described later, and that is coupled to the camera 15.

The camera 15 is arranged at a position so that the camera 15 may pick up an image of the rear side of the screen 11. As illustrated in FIG. 1, for example, the camera 15 may be arranged at a position corresponding to substantially the same position as the projector 13 that projects an image on the screen 11 with an optical axis of the camera 15 is targeted to the projection direction. When a mobile terminal to which the projector 13 and the camera 15 are coupled, a direction to which the projector 13 projects an image may not match with a direction that the camera 15 picks up an image. In this case, a prism to form an image of a rear side of the screen 11 to an optical axis of the camera 15 may be provided to the camera 15.

The controller 17 controls the projector 13 and the camera 15. The controller 17 includes an OS execution unit 17a, an application execution unit 17b, a display image storage unit 17c, a providing unit 17d, an acquisition unit 17e, a pickup image storage unit 17f, a detection unit 17g, and an output unit 17h. Hereinafter, a case is assumed in which a user instructs an application executed by a mobile terminal to perform an operation by operating an image displayed on the screen 11.

The OS execution unit 17a controls execution of an Operating System (OS). For example, the OS execution unit 17a detects an instruction to start an application or a command to an application at a position on the screen acquired by the output unit 17h, which will be described later. For example, when a position on the screen specified by the user is on an icon of the application, the OS execution unit 17a instructs the application execution unit 17b, which will be described later, to start an application corresponding to the icon. Another example is that when a position on the screen specified by the user is on an object, for example, a button or a tab that requests execution of a command on the operation screen of the currently running application, the OS execution unit 17a instructs the application execution unit 17b to execute the command.

The application execution unit 17b controls execution of an application based on an instruction by the OS execution unit 17a. For example, when the OS execution unit 17a instructs the application execution unit 17b to start an application or instructs an execution of a command to a currently running application, the application execution unit 17b operates the application. The application execution unit 17b registers a display image of processing result obtained by executing the application, for example, through a graphic driver (not illustrated) in the display image storage unit 17c, which will be described later. When the projector 13 is started, the application execution unit 17b registers a display image in the display image storage unit 17c after flipping right and left of the display image in order to address a display of the rear projection.

The display image storage unit 17c stores a display image to be displayed by the projector 13. The display image storage unit 17c functions as a frame buffer that is referred by the providing unit 17d, which will be described later, whenever the display image is updated by the application execution unit 17b during the projector 13 is in operation. The display image storage unit 17c is also referred by the detection unit 17g, which will be described later, when the detection unit 17b detects a position where a luminance is changed over the pickup image by comparing a difference between a display image stored in the display image storage unit 17c and a pickup image that is picked up by the camera 15.

The display image storage unit 17c may be a semiconductor memory device such as a Video Random Access Memory (VRAM), a Random Access Memory (RAM), a Read Only Memory (ROM), and a flash memory. A storage device such as a hard disk and an optical disk may be used as the display image storage unit 17c.

The providing unit 17d supplies a display image to the projector 13. For example, the providing unit 17d outputs a display image stored in the display image storage unit 17c whenever the display image is updated by the application execution unit 17b under a condition that the projector 13 is in operation. Here, a case in which the application execution unit 17b flips right and left of a display image. However, the providing unit 17d may flip the right and left of the display image and outputs the display image to the projector 13.

The acquisition unit 17e acquires a pickup image that is obtained by picking up an image of a rear side of the screen 11 by the camera 15. For example, the acquisition unit 17e starts the camera 15 in response to starting the projector 13. The acquisition unit 17e acquires images from the camera 15 and registers the images in the pickup image storage unit 17f, which will be described later, until the application execution unit 17b accepts a power off operation that turns off power supply to the projector 13. The acquisition unit 17e turns off power of the camera 15 when power of the projector 13 is turned off.

The pickup image storage unit 17f stores pickup images. The pickup image storage unit 17f registers pickup images acquired by the acquisition unit 17e when the projector 13 is in operation. Here, a case is assumed in which a pickup image is registered whenever a rear side of the screen 11 is picked up, in other words, whenever a frame of the pickup image is obtained. A frequency to register a pickup image may be once for the certain numbers of frames.

The pickup image storage unit 17f may be a semiconductor memory device such as a VRAM, a RAM, a ROM, and a flash memory. Moreover, a storage device such as a hard disk and an optical disk may be used as the display image storage unit 17f.

The detection unit 17g detects a position where luminance is changed in a pickup image. For example, the detection unit 17g detects a difference of a luminance value of a pickup image that is newly registered in the display image storage unit 17f and a luminance value of a display image stored in the display image storage unit 17c whenever the acquisition unit 17e registers a new pickup image in the display image storage unit 17f. The luminance value here indicates brightness of each pixel and represented, for example, by a numerical value from 1 to 256.

The above-described processing will be described. The detection unit 17g divides a pickup image and a display image into blocks with a certain size. For example, when a size of a display image projected to a rear side of the screen 11 imaged in a pickup image is substantially the same size as an image frame of a display image stored in the display image storage unit 17c, both of the images are divided into blocks of 10 pixels×10 pixels. The detection unit 17g determines, for each block of a pickup image and a display image, whether a total value of differences of luminance of each pixel in a block is a certain threshold or more. The detection unit 17g outputs an area, for example, an x-y coordinate on the pickup image of a block that a total value of differences of luminance values is a threshold or more to the output unit 17h, which will be described later.

Here, a size of a block obtained by division, 10 pixels×10 pixels is described. However, the size of the block may be changed as appropriate. An indicator, for example, a width of the finger and age that allows a size of a finger that touches the screen 11 to be measured is set, and a size of a block may be changed according to the set indicator. How much luminance is changed when a finger touches or does not touch the screen 11 is measured and an average of the measured values may be used as the certain threshold.

As described above, the detection unit 17g detects a difference of luminance values between a display image that is a raw image that is not influenced by external factors and a pickup image that is influenced by a change in luminance due to factors such as a change in a reflection amount of light projected by the projector 13. According to the detection result, the projector system 10 may determine whether a user touches the screen 11 to which the display image is projected.

Figure 3:
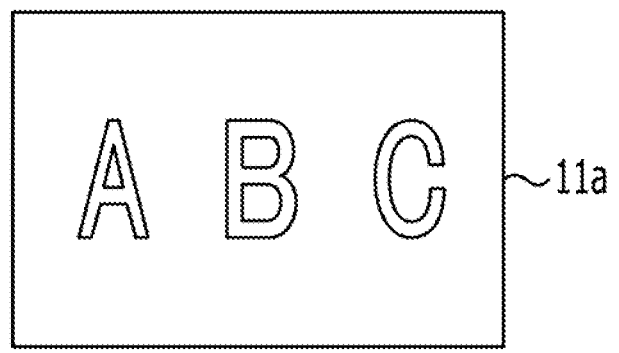
FIG. 3 illustrates an example of an image displayed on a front side of a screen.
Figure 4:
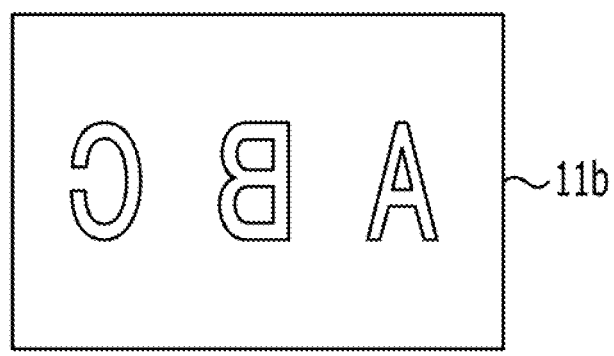
FIG. 4 illustrates an example of an image displayed on a rear side of a screen.
Figure 5:
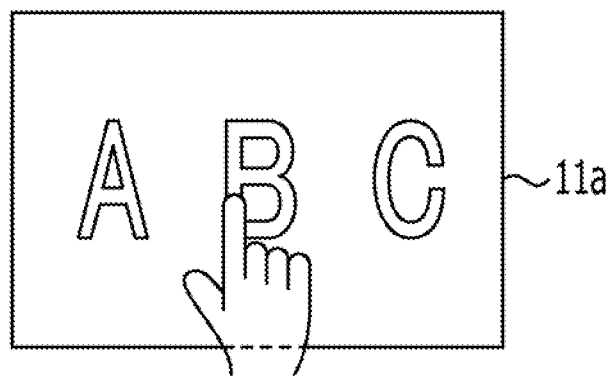
FIG. 5 is an example of a front view of a screen.
Figure 6:
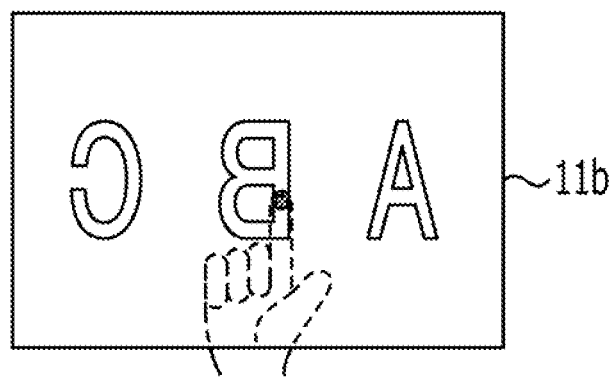
FIG. 6 is an example of a rear view of the screen.

The above-described processing will be described by referring to FIG. 3 to FIG. 6. FIG. 3 and FIG. 5 illustrate examples of the screen 11 viewed from the front side. FIG. 4 and FIG. 6 illustrate examples of the screen 11 viewed from the rear side. FIG. 3 illustrates the screen 11 viewed from the front side and FIG. 4 illustrate the screen 11 viewed from the rear side at time T1 when a user does not touch a screen image projected to the screen 11. Moreover, FIG. 5 illustrates the screen 11 viewed from the front side and FIG. 6 illustrates the screen 11 viewed from the rear side at time T2 (>T1) when a user touches a screen image. The reference numeral 11b indicates the rear side of the screen 11.

As illustrated in FIG. 3, an image projected by the projector 13, in other words, three alphabets, "A", "B", and "C" are displayed on the screen front side 11a at time T1. Meanwhile, as illustrated in FIG. 4, three alphabets, "A", "B", and "C" that are flipped left to right, in other words, a mirror image of the image displayed on the screen front side 11a is displayed on the screen rear side 11b.

As described above, at time T1, no object is present that interrupts light projected by the projector 13, and almost all of the light projected by the projector 13 is transmitted from the screen rear side 11b to the screen front side 11a.

At time T2 after time T1, as illustrated in FIG. 5, the user's finger touches the alphabet "B" on the screen displayed on the screen front side 11a. At this time, as illustrated in FIG. 6, the user's finger touches a portion of the alphabet "B" when viewed from the screen rear side 11b. A reflection amount of light projected by the projector 13 of the portion touched by the user's finger is more than the reflection amount of that at time T1. This is because the light is reflected by the finger that touches the front side of the screen 11 and returns to the rear side although the light projected by the projector 13 is transmitted from the rear side to the front side of the screen 11.

As described above, a reflection amount of projected light at the portion where the user's finger touches increases at time T2 when the user's finger touches the screen front side 11a. Therefore, when an image of a rear side of the screen is picked up by the camera 15a, luminance of the portion of the alphabet "B" where the user's finger touches on the pickup image is greater than the luminance of the portion when the user's finger does not touch at time T1. Meanwhile a content of an image in the display image does not change from that at time T1 illustrated in FIG. 4 regardless of whether the user's finger touches the screen. Accordingly, the detection unit 17g may detect a portion of the alphabet B where the user's finger touches, in other words, a shaded area in a circle in FIG. 6 as a position where the luminance is changed.

Here, detecting a change in luminance by dividing the pickup image and the display image into blocks is exemplified. However the embodiment is not limited to this example. For example, the device may output a position of a pixel to the output unit 17h when a difference of a luminance value of each pixel is a certain threshold or more.

The output unit 17h outputs information of a position of an area where a change in luminance is detected on a pickup image. For example, the output unit 17h outputs a position in the pickup image of a block where a total value of a difference of a luminance value is a threshold or more to the OS execution unit 17a as a position on the screen specified by a user.

Hereinafter, a position specified by a user on a screen image projected to the screen 11 is referred to as a "user-specified position."

When a plurality of blocks is present, the output unit 17h may adoptively conduct embodiments described below. For example, the output unit 17h combines blocks that have a distance of the number of blocks or pixels is within a certain distance into a rectangle or a circle. The output unit 17h may assume a center or a center of gravity of the rectangle or the circle obtained as described above with substantially the largest area as a position specified by the user. Alternatively, the output unit 17h may assume a center or a center of gravity of a polygon or a circle formed so as to substantially surround all of the blocks detected by the detection unit 17g as a user-specified position. The output unit 17h may define a user-specified position in substantially the same manner as described above when the detection unit 17g detects a position of a pixel.

Various types of integrated circuits or electronic circuits may be used for the OS execution unit 17a, the providing unit 17d, the acquisition unit 17e, the detection unit 17g, and the output unit 17h included in the controller 17 illustrated in FIG. 2. Moreover, functional units included in the controller 17 may be provided by another integrated circuit or an electronic circuit. For example, an Application Specific Integrated Circuit (ASIC), and a Field Programmable Gate Array (FPGA) may be an integrated circuit. A Central Processing Unit (CPU) or an Micro Processing Unit (MPU) may be an electronic circuit.

Processing Flow

Figure 7:
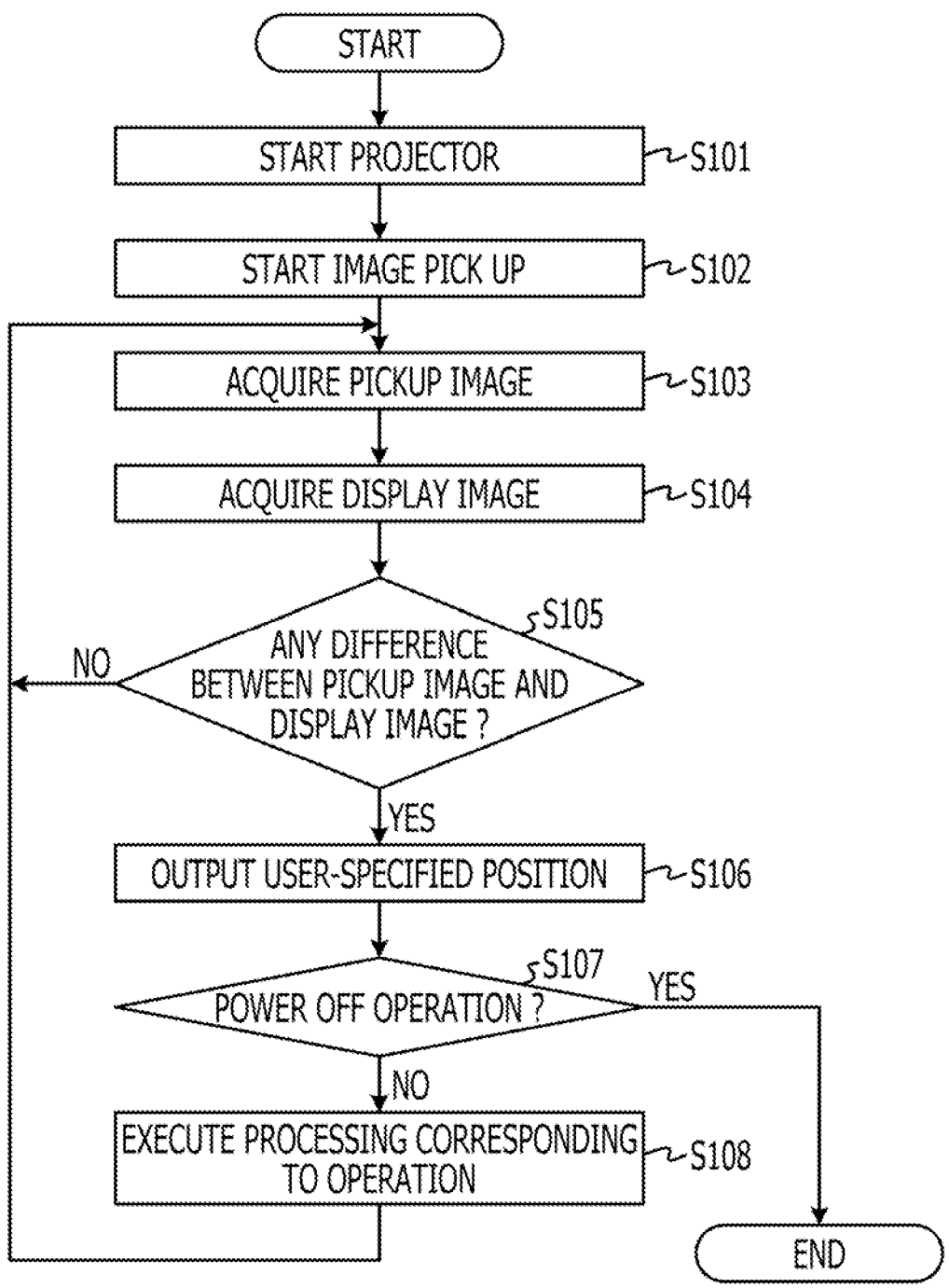
FIG. 7 is a flow chart illustrating a position detection processing procedure according to the first embodiment.

Processing flow according to the embodiment will be described. FIG. 7 is a flow chart illustrating a position detection processing procedure according to the first embodiment. The position detection processing starts when the projector 13 is started, and is repeated recursively by the controller 17 until power of the projector 13 is turned off.

As illustrated in FIG. 7, when the projector 13 is started (operation S101), the acquisition unit 17e starts the camera 15 and starts to pick up an image of the rear side of the screen 11 (operation S102).

The detection unit 17g acquires a pickup image that is newly registered by the acquisition unit 17e from the pickup image storage unit 17f (operation S103). The detection unit 17g acquires a display image stored in the display image storage unit 17c (operation S104).

The detection unit 17g detects a difference of a luminance value of an area of the pickup image newly registered in the pickup image storage unit 17f and a luminance value of the corresponding area of the display image stored in the display image storage unit 17c (operation S105). If no difference of luminance values is detected between the pickup image and the display image (operation S105: No), processing returns to operation S103 because no screen operation is determined to have been performed by the user.

When a difference of luminance values between the pickup image and the display image is detected (operation S105: Yes), the output unit 17h outputs a position in the pickup image where the difference of luminance values is detected to the OS execution unit 17a as a user-specified position (operation S106). The OS execution unit 17a determines whether an operation corresponding to the user-specified position is an operation to turn off the projector 13 (operation S107).

If the operation is not an operation to turn off the projector 13 (operation S107: No), the application execution unit 17b executes processing corresponding to the operation (operation S108), and repeats processing of the above-described operations S103 to S107. If the operation is to turn off the projector 13 (operation S107: Yes), power of the camera 15 is turned off and the processing ends.

Effects of the First Embodiment

As described above, the projector system 10 according to the embodiment acquires a pickup image in which an image on a rear side of the screen 11 is picked up by the camera 15. The projector system 10 according to the embodiment detects a position in the pickup image where luminance is changed. The projector system 10 according to the embodiment outputs the position where the change in luminance is detected on the pickup image.

Accordingly, the projector system 10 according to the embodiment may output a position where a user specifies by touching on a screen image by executing image processing by software using a pickup image that is picked up by a camera 15. Hence, the projector system 10 according to the embodiment does not need hardware such as a laser beam pointer and a filter as in the above-described projector with the coordinate input function according to the related art. Moreover, the projector system 10 according to the embodiment does not need hardware to detect a change in a capacitance and a voltage used, for example, for a touch panel. Thus, the projector system 10 according to the embodiment allows a position on a screen specified by a user to be detected with a device configuration.

Although an embodiment of the disclosed device has been described, the present disclosure may be embodied by various different forms. Thus, hereinafter another embodiment included in the present disclosure will be described.

Luminance Change Detection Method

According to the first embodiment, detecting a position where luminance is changed on a pickup image according to whether luminance values differ between the pickup image and the display image is described. However, the disclosed device is not limited to this method. For example, the disclosed device may detect a position where luminance is changed on the pickup image according to whether the pickup image changes with time, in other words, whether there is any difference between frames of the pickup images.

Hereinafter, the above-described method will be described. The detection unit 17g determines whether there is any difference of a luminance value of a newly registered pickup image and a luminance value of a frame that is already stored in the pickup image storage unit 17f, for example, a previous frame stored in the pickup image storage unit 17f. When a difference of frames is detected as described above, a position where the luminance is changed on the pickup image may be detected by determining whether there is any difference of luminance values by dividing each pickup image into blocks as in detecting luminance values of a pickup image and a display image. A position of a block where a luminance change is detected by determining whether there is any luminance difference of frames of the pickup images for each block may be output as a user-specified position. A change in luminance of a frame picked up when a finger experimentally touches the screen 11 and a frame picked up when a finger does not touch the screen is measured and an average value of the measured values may be used as the certain threshold as in the first embodiment.

The above-described example describes when there is a difference of luminance values of the current frame and the previous frame, the position of the block is immediately output as the user-specified position. However, the embodiment is not limited to this example. For example, when a difference of frames of the pickup image remains for a certain time period, for example, for one second, the position of the block may be output as the user-specified position. Accordingly, erroneously determining a position as a user-specified position when a difference of luminance values of frames is suddenly detected due to, for example, by external light, may be reduced, if not substantially prevented.

Gel Layer

A flexible and transparent gel layer may be provided at a front side of the screen 11 of the disclosed system and a center position of an area where a luminance is changed may be detected. In other words, when the gel layer is provided at the front side of the screen 11, pressing the gel layer by the user causes a portion of the gel layer to be deflected and dent. In this case, a distorted portion of the gel layer pressed by the user's finger is picked up in the pickup image that is different from the case in which luminance of the pickup image is changed due to reflection of light projected by the projector 13 by the user's finger. Thus, distortion picked up in the pickup image may be detected as a change in luminance.

Figure 8:
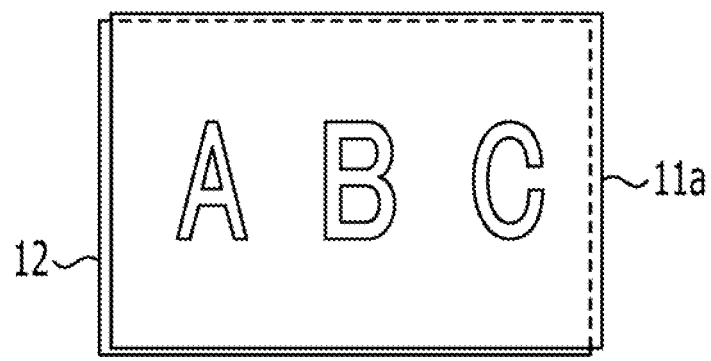
FIG. 8 is an example of an image displayed on a front side of a screen.
Figure 9:
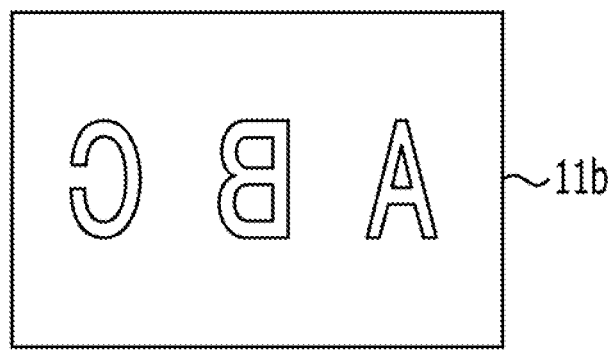
FIG. 9 is an example of an image displayed on a rear side of a screen.
Figure 10:
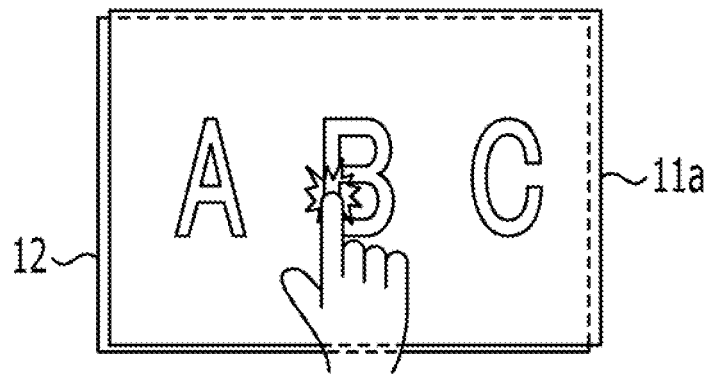
FIG. 10 is an example of a front view of a screen.
Figure 11:
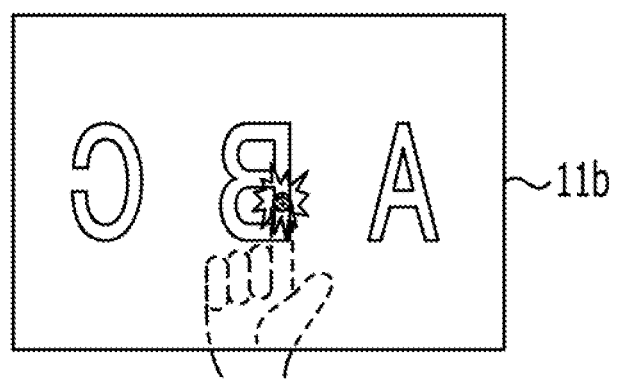
FIG. 11 is an example of a rear view of the screen.

The above-described gel layer will be described by referring to FIG. 8 to FIG. 11. FIG. 8 and FIG. 10 are examples when a screen 1120 is viewed from the front side. FIG. 9 and FIG. 11 are examples when the screen 1120 is viewed from the rear side. FIG. 8 and FIG. 9 illustrate the screen 11 viewed from the front side (FIG. 8) and the rear side (FIG. 9) in a state that a user does not touch a screen image at time T1. FIG. 10 and FIG. 11 illustrate the screen 11 viewed from the front side (FIG. 10) and the rear side (FIG. 11) in a state that a user touches a screen image at time T2 (>T1). The reference numeral 11a indicates the front side of the screen 11, the reference numeral 11b indicates the rear side of the screen 11, and the reference numeral 12 indicates a gel layer provided over the front side of the screen 11.

At time T1, as illustrated in FIG. 8, a display image projected by the projector 13, in other words, three alphabets "A", "B", and "C" are displayed on the screen front side 11a. At this time, as illustrated in FIG. 9, a mirror image of the image displayed on the screen front side 11a, in other words, the left to right flipped three alphabets "A", "B", and "C" are displayed on the screen rear side 11b.

As described above, at time T1, there is no change in the gel layer 12, and almost all of the lights projected by the projector 13 are transmitted from the screen rear side 11b to the screen front side 11a, and to the gel layer 12.

At time T2, as illustrated in FIG. 10, a portion of the gel layer 12 attached to the screen front side 11a where the alphabet "B" is displayed is pressed by the user's finger. As illustrated in FIG. 11, viewing from the screen rear side, the gel layer 12 is deflected and dented to surround a portion of the alphabet B where the user's finger touches. Hence, a reflection amount of light projected by the projector 13 is changed compared with before the gel layer 12 is deflected at the portion of the alphabet "B" where the user's finger touches at time T1.

As described above, at time T2 when the user's finger presses the gel layer 12, the reflection amount of the projected light at the portion where the user's finger touches is changed due to deflection and deform of the gel layer 12. Accordingly, when the camera 15 picks up the screen rear side 11b, a portion of the alphabet B where the user's finger touches deflects and luminance of the portion changes from a state before the portion is pressed. Meanwhile, the content of the display image does not change from the state at time T1 illustrated in FIG. 4 regardless of whether the user's finger touches the gel layer 12. Hence, the detection unit 17g may detect a position where luminance is changed that is the portion of the alphabet "B" where the user's finger presses the gel layer 12, in other words, a hatched circle portion in FIG. 11.

The above-described methods may be applied to detect a change in luminance. For example, as in the first embodiment, the detection unit 17g may determine the luminance is changed by dividing a pickup image and a display image into blocks with a certain size and when a total value of differences of luminance values for each of the divided blocks is a certain threshold or more. Moreover, as in the second embodiment, the detection unit 17g may determine the luminance is changed when a difference of luminance of frames picked up by the camera 15 is a certain threshold or more.

The gel layer 12 typically deforms when an external force is applied, thus no distortion is caused on the pickup image even if the luminance of the pickup image partially increases due to, for example, external light. Hence, detecting a change in luminance by distortion of the pickup image reduces, if not substantially prevents, erroneous determination of a change in luminance on the pickup image, for example, by external light as a user's operation.

Image Providing Method

According to the first embodiment, a case is exemplified in which an application included in the controller 17 provides an image to be displayed by the projector 13. However, an image providing source may be any device. For example, a server device coupled to the projector system 10 through a network may provide an image to the projector 13. In this case, the server device receives a position where a change in luminance is detected over a pickup image from the projector system 10 and may provide an image to be displayed to the projector system 10 according to the received position in the pickup image.

For example, it is assumed that the detection unit 17g detects a position corresponds to "B" of the display image and the output unit 17h outputs the position to the server device. In this case, the server device reads another display image to be output subsequently from a storage device of the server device in response to a selection of "B" by the user and notifies the application execution unit 17b of the other display image through the network.

Application Example 1

The first embodiment exemplifies a case in which spaces of the screen 11, the projector 13, and the camera 15 are open. However, the disclosed device is not limited to this. For example, the rear side of the screen 11, the projector 13, and the camera 15 in the disclosed device may be covered by a dark box that shields an external light.

Figure 12:
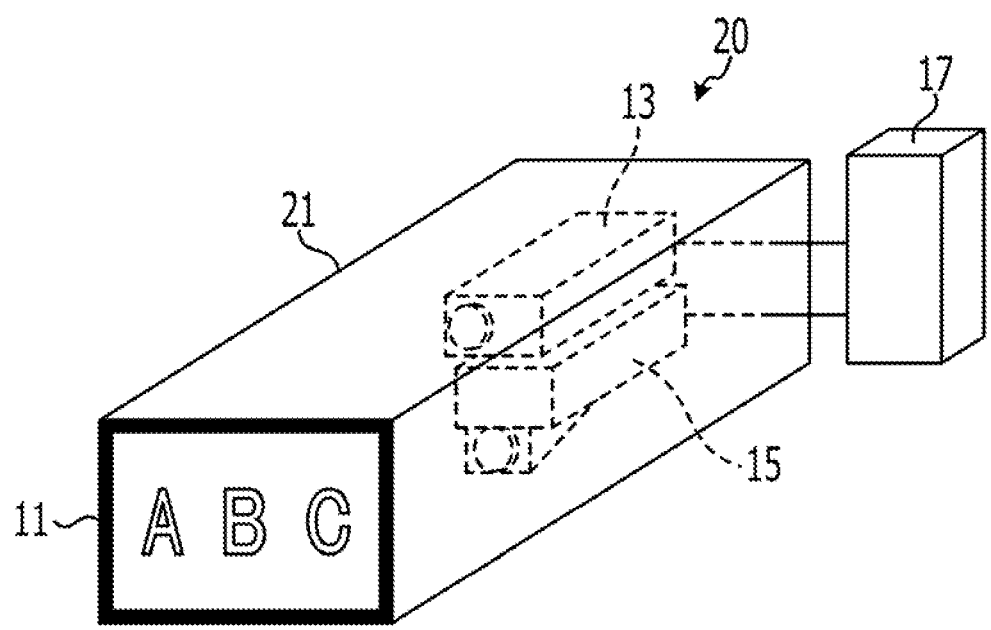
FIG. 12 illustrates an application example 1.

FIG. 12 illustrates the application example 1. As illustrated in FIG. 12, a dark box 21 the inside of which is blacked out to shield an external light is provided in a projector device 20. The projector 13 and the camera 15 are arranged and accommodated in the dark box 21 in the projector device 20 and the screen 11 is arranged over one face of the dark box 21.

Under the above-described configuration, when the projector 13 projects an image to the screen 11, influence of the external light irradiated to the projector 13 and the screen 11 may be suppressed. For example, according to the projector device 20 of the application example, a contrast of an image displayed on the front side of the screen 11, in other words, an image viewable by a user, and a pickup image picked up by the camera 15 may be enhanced. For example, a contrast (obtained by dividing white luminance by black luminance) is reduced to approximately 4 under a bright environment of about 4000 lux when the dark box 21 is not used. On the other hand, the contrast may be enhanced to about 8 when the dark box 21 is used. Furthermore, according to the projector device 20 of the application example, a change of a contrast due to a change in brightness of the surrounding environment of the projector device 20 may be suppressed.

Application Example 2

Figure 13:
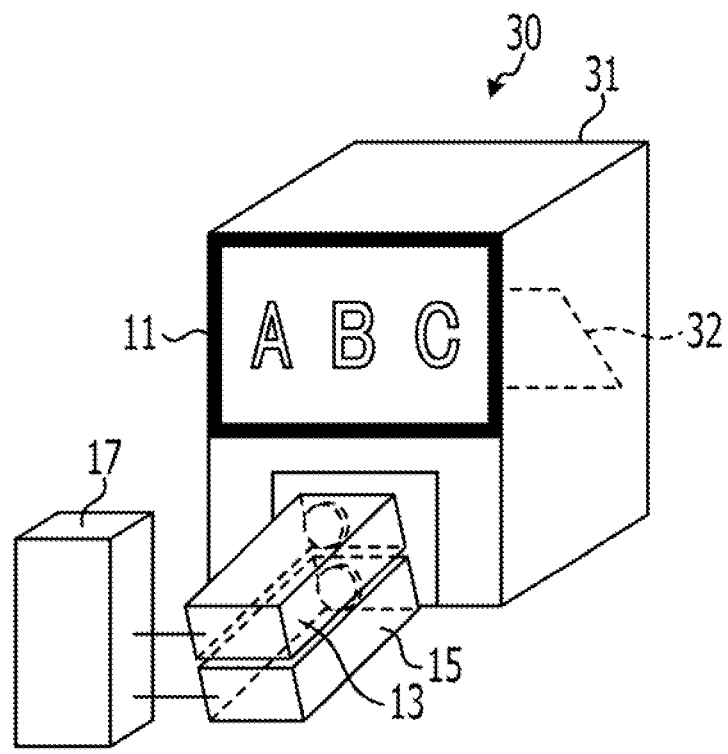
FIG. 13 illustrates an application example 2.

The application example 1 describes using the dark box 21. Reducing the size of the dark box 21 will be described below. FIG. 13 illustrates the application example 2. As illustrated in FIG. 13, a light path from the projector 13 to the screen 11 is folded back by using a mirror 32 when a dark box 31 is provided to a projector system 30. The mirror 32 also folds back a light path from the rear side of the screen 11 to the camera 15. Accordingly, the size of the dark box 31 may be reduced according to the projector system 30 of the application example, thereby improving portability of the device. Moreover, the projector 13 and the camera 15 are installed on the dark box 31 from the front side of the screen 11 in the projector system 30. Thus, the projector system according to the application example, may improve operability when the projector 13 and the camera 15 are installed on the dark box 31. The projector 13 and the camera 15 are not necessarily always installed to the dark box 31 and may be removable. In other words, the projector 13 and the camera 15 may be installed typically when a display image is to be projected to the screen 11.

FIG. 13 illustrates a case in which one mirror 32 is provided in the dark box 31. However, the number of mirrors 32 is not limited to one. Increasing the number of mirrors 32 to further fold back a light path from the projector 13 to the screen 11 allows the size of the dark box 21 to be reduced further.

Application Example 3

Figure 14:
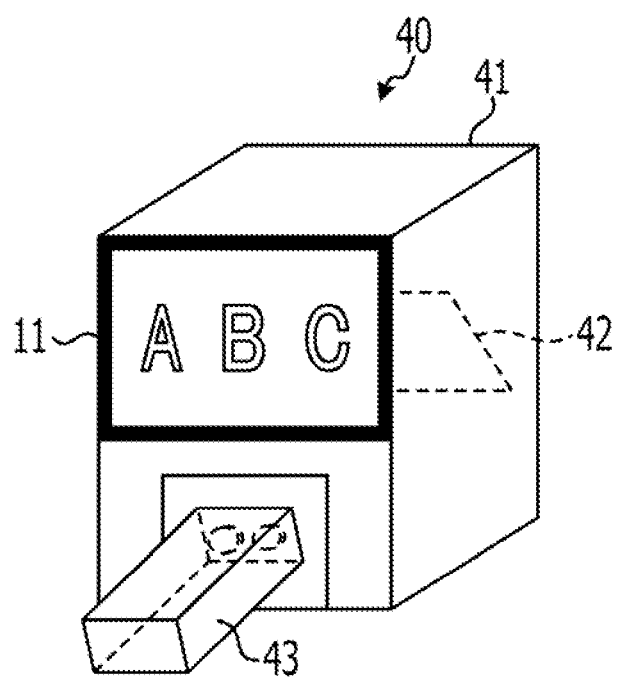
FIG. 14 illustrates an application example 3.

According to the application example 2, the projector 13, the camera 15, and the controller 17 are configured as separate units. According to the application example 3, a case will be described in which these three units are integrated into one unit. FIG. 14 illustrates the application example 3. As illustrated in FIG. 14, providing a dark box 41 and a mirror 42 to a projector system 40 is substantially similar to the above-described application example 2. However integrating the projector 13, the camera 15 and the controller 17 into one integrated unit 43 is different from the application example 2. As a result, the projector system 40 of the application example 3 may further reduce the size of the device. As in the application example 2, the integrated unit 43 of the application example 3 is not necessarily always installed on the dark box 41 but may be removable. In other words, the integrated unit 43 may be installed on the dark box 41 typically when a display image is to be projected to the screen 11.

Other Devices

The components of each device may not necessarily be physically configured as illustrated. In other words, distribution and integration of respective devices are not necessarily limited to those illustrated but all or part of the components may be functionally or physically separated and integrated according to various loads and usage. For example, the acquisition unit 17e, the detection unit 17g, and the output unit 17h may be coupled as external devices of the projector device through a network. Moreover, different devices may include the acquisition unit 17e, the detection unit 17g, and the output unit 17h respectively and functions of the above-described projector device may be achieved by collaboration of the different devices that are coupled through a network. Furthermore, other devices may have all or part of display images and pickup images respectively and functions of the above-described projector device may be achieved by collaboration with the other devices that are coupled through a network.

Position Detection Program

Moreover, various types of processing described according to the above-described embodiments may be achieved by executing a program by a personal computer or a workstation, for example. An example of a computer that executes a position detection program providing substantially the same functions as the above-described embodiments will be described by referring to FIG. 15.

Figure 15:
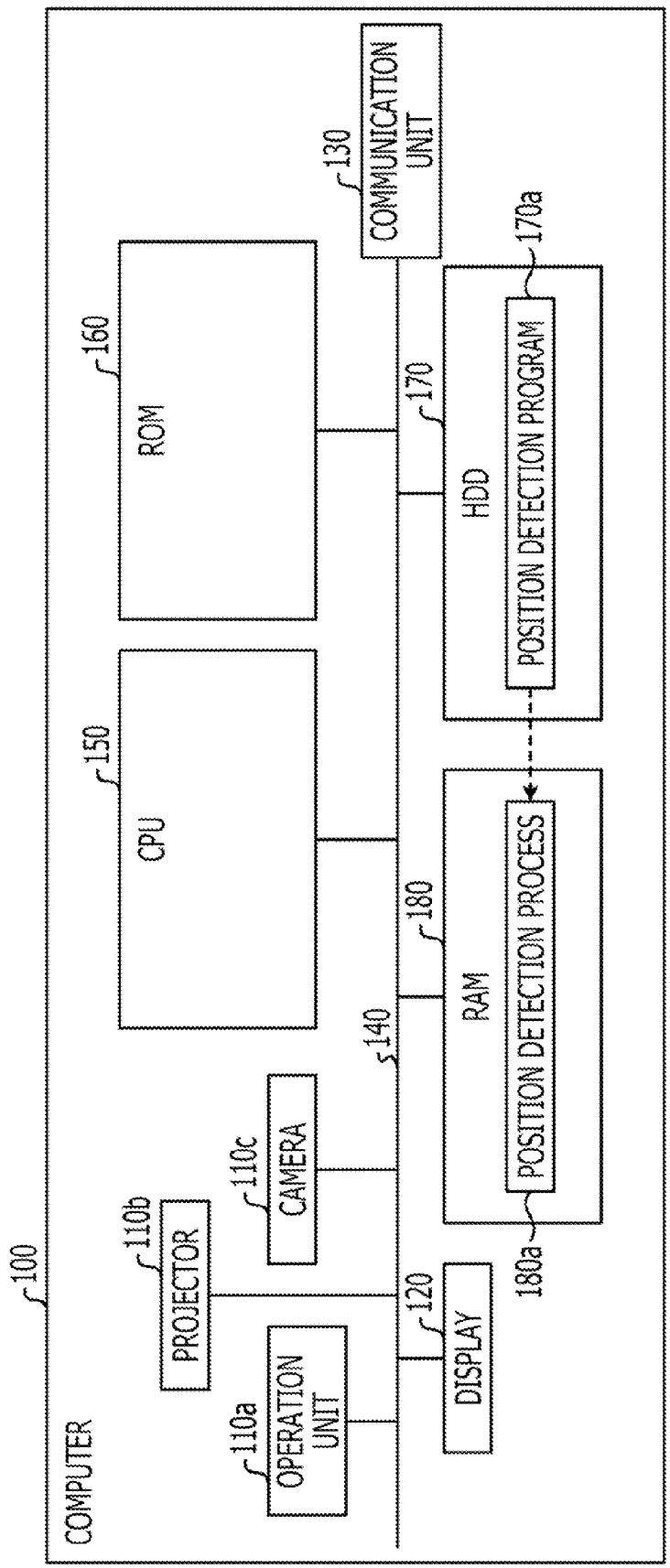
FIG. 15 illustrates an example of a computer that executes a position detection program according to the first embodiment and a second embodiment.

FIG. 15 illustrates an example of a computer that executes a position detection program according to the first embodiment and the second embodiment. As illustrated in FIG. 15, a computer 100 according to the second embodiment includes an operation unit 110a, a projector 110b, a camera 110c, a display 120, and a communication unit 130. Moreover, the computer 100 includes a CPU 150, a ROM 160, a Hard Disk Drive (HDD) 170, and a Random Access Memory (RAM) 180. Each of the above-described components 110 to 180 are coupled through a bus 140.

The HDD 170 stores, as illustrated in FIG. 15, a position detection program 170a that exhibits substantially the same functions as the acquisition unit 17e, the detection unit 17g, and the output unit 17h according to the first embodiment. The position detection program 170a may be appropriately integrated or separated as in each of the acquisition unit 17e, the detection unit 17g, and the output unit 17h illustrated in FIG. 2. In other words, all of data to be stored in the HDD 170 may not necessarily be stored in the HDD 170 but data that is desired for processing may be stored in the HDD 170.

The CPU 150 reads the position detection program 170a from the HDD 170 and deploys in the RAM 180. Accordingly, as illustrated in FIG. 15, the position detection program 170a functions as a position detection process 180a. The position detection process 180a deploys various data read from the HDD 170 in an area of the RAM 180 assigned to the position detection process 180a and executes various types of processing based on the deployed various data. The position detection process 180a includes processing executed by the acquisition unit 17e, the detection unit 17g, and the output unit 17h that are illustrated in FIG. 2, for example, processing illustrated in FIG. 7. Although it is not illustrated, reading programs corresponding to the OS execution unit 17a, the application execution unit 17b, or the providing unit 17d that are illustrated in FIG. 2 from the HDD 170 and deploying in the RAM 180 by the CPU 150 start processes that execute processing corresponding to the OS execution unit 17a, the application execution unit 17b, or the providing unit 17d. Various data stored in the display image storage unit 17c and the pickup image storage unit 17f is stored in, read from the HDD 170 and the RAM 180 and used by the position detection program 170a. All of the components that are virtually achieved on the CPU 150 are not necessarily operated on the CPU 150 altogether but processing units that are typically desired for processing may be virtually achieved.

The above-described position detection program may not necessarily be stored in the HDD 170 and the ROM 160. Each program may be stored in a portable physical medium (a computer-readable recording medium) inserted into the computer 100, for example, a flexible disk (FD), a Compact Disc-Read Only Memory (CD-ROM), a Digital Versatile Disc (DVD), an magneto-optical disk and an integrated circuit (IC) card. The computer 100 may acquire each program from the portable physical medium. Each program may be stored in another computer and a server device that are coupled to the computer 100 through a public network, the Internet, a LAN, or a WAN and the computer 100 may acquire each program from the computer or the server and execute the program.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW (ReWritable). An example of communication media includes a carrier-wave signal. The media described above does not include a transitory medium such as a propagation signal.

According to an aspect of the embodiments of the invention, any combinations of one or more of the described features, functions, operations, and/or benefits can be provided. A combination can be one or a plurality. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A projector device comprising:
   a processor configured to:
      acquire an image from an image pickup unit that picks up the image on a projection side of a transmissive type screen to which a display image is projected by a projector,
      detect a position where a luminance is changed on the acquired image, and
      output the position on the acquired image where the change in luminance is detected; and
   a memory configured to store the acquired image,
      wherein the transmissive type screen is provided with a gel layer on a side opposite to the projection side, and the processor detects a center position of an area on the acquired image where the luminance is changed.

2. The projector device according to claim 1, wherein the processor detects one of an area where a difference in luminance of corresponding positions of the display image and the acquired image is equal to or more than a certain value and an area where a change in luminance according to a time when the image is picked up by the image pickup unit is equal to or more than a certain value.

3. The projector device according to claim 1, wherein
the projector is configured to project the display image on the transmissive type screen; and
the image pickup unit is configured to pick up the projection side of the screen where the display image is projected.

4. A non-transitory computer-readable recording medium having a position detection computer program recorded thereon that causes a computer to execute a process, the position detection computer program causing the computer to execute the process comprising:
acquiring an image from an image pickup unit that picks up the image on a projection side of a transmissive type screen to which a display image is projected by a projector;
detecting a position on the acquired image where a luminance is changed; and
outputting the position on the acquired image where the change in luminance is detected,
wherein the transmissive type screen is provided with a gel layer on a side opposite to the projection side, and the detecting detects a center position of an area on the acquired image where the luminance is changed.

5. The non-transitory computer-readable recording medium according to claim 4, wherein the detecting detects one of an area where a difference in luminance of corresponding positions of the display image and the acquired image is equal to or more than a certain value and an area where a change in luminance according to a time when the image is picked up by the image pickup unit is equal to or more than a certain value.

6. An image providing method enabling a computer that is coupled to a projector device to execute operations, the operations comprising:
receiving a position where a change in luminance in a picked up image picked up by the projector device is detected, the picked up image being an image of a projection side of a transmissive type screen to which a display image is projected; and
providing an image to be displayed by the projector device according to a position in the received picked up image,
wherein the transmissive type screen is provided with a gel layer on a side opposite to the projection side, and a processor detects a center position of an area on the acquired image where the luminance is changed.

7. The image providing method according to claim 6, wherein the computer is coupled to the projector device via a network.

8. A projector system comprising:
a projector configured to project a display image;
a transmissive type screen configured to display the projected display image;
an image pickup unit configured to pick up an image on a projection side of the transmissive type screen to which the display image is projected;
a processor configured to:
acquire the image picked up by the image pickup unit;
detect a position where a luminance is changed on the acquired image; and
output the position where the change in luminance is detected on the acquired image,
wherein the transmissive type screen is provided with a gel layer on a side opposite to the projection side, and the processor detects a center position of an area on the acquired image where the luminance is changed.

9. The projector system according to claim 8 wherein the processor detects one of an area where a difference in luminance of corresponding positions of the display image and the acquired image is equal to or more than a certain value and an area where a change in luminance according to a time when the image is picked up by the image pickup unit is equal to or more than a certain value.

* * * * *